(12) United States Patent
Matsubara

(10) Patent No.: US 10,983,712 B2
(45) Date of Patent: Apr. 20, 2021

(54) STORAGE CONTROL SYSTEM AND POWER CONSUMPTION CONTROL METHOD

(71) Applicant: HITACHI, LTD., Tokyo (JP)

(72) Inventor: Ryosuke Matsubara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 69 days.

(21) Appl. No.: 16/354,264

(22) Filed: Mar. 15, 2019

(65) Prior Publication Data

US 2019/0384513 A1 Dec. 19, 2019

(30) Foreign Application Priority Data

Jun. 13, 2018 (JP) .............................. JP2018-113170

(51) Int. Cl.
*G06F 3/06* (2006.01)
*G06F 12/00* (2006.01)
*G06F 13/00* (2006.01)

(52) U.S. Cl.
CPC ............ *G06F 3/0625* (2013.01); *G06F 3/061* (2013.01); *G06F 3/0634* (2013.01); *G06F 3/0653* (2013.01); *G06F 3/0688* (2013.01)

(58) Field of Classification Search
CPC ...... G06F 3/0625; G06F 3/061; G06F 3/0634; G06F 3/0653; G06F 3/0688
USPC ........................................................ 711/104
See application file for complete search history.

(56) References Cited

U.S. PATENT DOCUMENTS

| | | | | |
|---|---|---|---|---|
| 2011/0119509 A1* | 5/2011 | Yanagawa | ................ | G06F 3/067 713/320 |
| 2011/0271049 A1* | 11/2011 | Zimoto | ................. | G06F 1/3287 711/114 |
| 2011/0276759 A1* | 11/2011 | Chien | ..................... | G06F 3/061 711/114 |
| 2012/0096289 A1* | 4/2012 | Kawakami | ............ | G06F 1/3268 713/320 |
| 2014/0281121 A1* | 9/2014 | Karamcheti | .......... | G06F 9/4881 711/102 |
| 2018/0181186 A1* | 6/2018 | Diefenbaugh | .......... | G06F 3/067 |
| 2019/0346904 A1* | 11/2019 | Tannenberger | ......... | G06F 13/14 |
| 2019/0384513 A1* | 12/2019 | Matsubara | ............ | G06F 3/0625 |

FOREIGN PATENT DOCUMENTS

JP 2013-097635 A 5/2013

OTHER PUBLICATIONS

Japanese Office Action dated Mar. 31, 2020 for the Japanese Patent Application No. 2018-113170.

* cited by examiner

*Primary Examiner* — Mohamed M Gebril

(74) *Attorney, Agent, or Firm* — Volpe Koenig

(57) ABSTRACT

A storage control system acquires, for each of a plurality of power control groups in which a plurality of storage devices which form the basis of a plurality of redundancy configuration groups are classified, an I/O (Input/Output) amount of the power control group. For each of the plurality of power control groups, the storage control system controls power consumption of each of the storage devices belonging to the power control group in power control group units, based on the acquired I/O amount relating to the power control group. None of the plurality of redundancy configuration groups spans two or more power control groups among the plurality of power control groups, all being contained in any of the plurality of power control groups.

12 Claims, 12 Drawing Sheets

FIG. 3

PSNG MANAGEMENT TABLE
300

| PSNG# 301 | PSNG Power Saving Level 302 | | | QoS 303 | NVRAM# 304 | RG# 305 | Start address 306 | Capacity 307 |
|---|---|---|---|---|---|---|---|---|
| | Current Level 311 | Lower limit 312 | Upper limit 313 | | | | | |
| 1 | Level1 | Normal | Level1 | 1st | 1 | 1 | 0h | 50GB |
| | | | | | 2 | 1 | 0h | 50GB |
| | | | | | | 2 | 6400000h | 10GB |
| | | | | | | 3 | 7800000h | 5GB |
| | | | | | 3 | 1 | 0h | 50GB |
| | | | | | | 2 | 6400000h | 10GB |
| | | | | | | 3 | 7800000h | 5GB |
| | | | | | ... | ... | ... | ... |
| 2 | Level2 | Level2 | Level3 | 2nd | 8 | 4 | 0h | 20GB |
| | | | | | | 5 | 2800000h | 20GB |
| | | | | | 9 | 4 | 0h | 20GB |
| | | | | | | 5 | 2800000h | 20GB |
| | | | | | ... | ... | ... | ... |
| 3 | Normal | Normal | Level2 | 3rd | 13 | 6 | 0h | 10GB |
| | | | | | 14 | 6 | 0h | 10GB |
| | | | | | ... | ... | ... | ... |
| ... | ... | ... | ... | ... | | | | |

FIG. 4

I/O PERFORMANCE REQUIREMENT TABLE 400

| PSNG# 401 | Power Saving Level 402 | I/O performance requirement 403 | |
| --- | --- | --- | --- |
| | | Upper limit 411 | Lower limit 412 |
| 1 | Normal | - | 48M IO/min<br>400 GB/min |
| | Level1 | 48M IO/min<br>250 GB/min | 24M IO/min<br>100 GB/min |
| | Level2 | 24M IO/min<br>100 GB/min | 8M IO/min<br>30 GB/min |
| | Level3 | 8M IO/min<br>30 GB/min | - |
| 2 | Normal | ⋮ | ⋮ |
| | Level1 | ⋮ | ⋮ |
| | Level2 | ⋮ | ⋮ |
| | Level3 | ⋮ | ⋮ |
| ⋮ | | | |

FIG. 5

MAPPING TABLE
500

| NVRAM# | | Power Saving Level | | |
|---|---|---|---|---|
| | | Normal | Level1 | Level2 |
| | Performance Index | Full performance | Random write > 90kIOPS<br>Random read > 700kIOPS | Random write > 80kIOPS<br>Random read > 600kIOPS |
| 1 | NVRAM Power Saving Level | Normal | Lv1 | Lv2 |
| | Write performance | 100k IOPS | 90k IOPS | 80k IOPS |
| | Read performance | 800k IOPS | 720k IOPS | 640k IOPS |
| | Power consumption | 25W | 20W | 15W |
| 2 | NVRAM Power Saving Level | Normal | Lv1 | Lv2 |
| | Write performance | 110k IOPS | 100k IOPS | 90k IOPS |
| | Read performance | 900k IOPS | 810k IOPS | 720k IOPS |
| | Power consumption | 25W | 22W | 16W |
| 3 | NVRAM Power Saving Level | Normal | ← | Lv1 |
| | Write performance | 100k IOPS | ← | 80k IOPS |
| | Read performance | 800k IOPS | ← | 640k IOPS |
| | Power consumption | 25W | ← | 15W |
| ⋮ | | ⋮ | ⋮ | ⋮ |

FIG. 6

POWER MANAGEMENT TABLE
600

|  | Current Value | Power Capping Value |
|---|---|---|
| Power Consumption | 1200W | 1500W |

FIG. 7

| NVRAM Power Saving Register Designation Value | NVRAM Power Saving Level | Power | Performance Value(Random write) | Performance Value(Random read) |
|---|---|---|---|---|
| 00h | Normal | 25W | 100kIOPS | 800kIOPS |
| 01h | Lv1 | 20W | 90kIOPS | 720kIOPS |
| 02h | Lv2 | 15W | 80kIOPS | 640kIOPS |
| 03h | Lv3 | 10W | 70kIOPS | 560kIOPS |
| ... | ... | ... | ... | ... |

FIG. 13

| NVRAM# | ... | NVRAM Power Saving Level | The number of RAID groups (R) | PSNG Power Saving Level | |
|---|---|---|---|---|---|
| | | | | ... | ... |
| | | | | Level1 | ... |
| | | | ... | ... | ... |
| 1 | ... | | 1 ≤ R < 3 | Lv1 | ... |
| | | | 3 ≤ R | Normal | ... |
| ... | | | | ... | ... |

STORAGE CONTROL SYSTEM AND POWER CONSUMPTION CONTROL METHOD

CROSS-REFERENCE TO PRIOR APPLICATION

This application relates to and claims the benefit of priority from Japanese Patent Application number 2018-113170, filed on Jun. 13, 2018 the entire disclosure of which is incorporated herein by reference.

BACKGROUND

The present invention generally relates to storage control of a plurality of storage devices and more particularly to power consumption control.

As technology relating to power consumption control of a plurality of storage devices, the technology disclosed in PTL 1, for example, is known. According to PTL 1, power consumption control is performed in HDD (Hard Disk Drive) units or in RAID (Redundant Array of Independent (or Inexpensive) Disks) group units.

[PTL 1] Japanese Patent Application Laid-Open Publication No. 2013-097635

SUMMARY

In recent years, the storage capacity of storage device units has been increasing and at least one storage device sometimes belongs to a plurality of RAID groups. In such a case, when power consumption is controlled in HDD units or RAID group units, I/O performance drops and consequently there is a risk that the balance between I/O performance and power savings will be adversely affected. More specifically, for example, the power consumption of the HDD or RAID group is reduced due to the fact that the I/O amount (I/O frequency, for example) of a certain HDD or RAID group is small. However, when this HDD or at least one HDD which belongs to the RAID group belongs to a RAID group with a large I/O amount, the I/O performance of the large I/O amount RAID group can drop.

This kind of problem can also arise in a case where another type of redundancy configuration group (a RAIN (Redundant Array of Independent (or Inexpensive) Nodes), for example) is adopted instead of or in addition to the RAID group.

The storage control system acquires, for each of a plurality of power control groups in which a plurality of storage devices which form the basis of a plurality of redundancy configuration groups are classified, an I/O (Input/Output) amount of the power control group. For each of the plurality of power control groups, the storage control system controls power consumption of each of the storage devices belonging to the power control group in power control group units, based on the acquired I/O amount relating to the power control group. None of the plurality of redundancy configuration groups spans two or more power control groups among the plurality of power control groups.

According to the present invention, even when at least one of the storage devices belongs to a plurality of redundancy configuration groups, the balance between I/O performance and power savings can be maintained.

BRIEF DESCRIPTION OF THE DRAWINGS

FIG. 3 shows a configuration of a PSNG management table.
FIG. 4 shows a configuration of an I/O performance requirement table.
FIG. 5 shows a configuration of a mapping table.
FIG. 6 shows a configuration of a power management table.
FIG. 7 shows power characteristics of a certain NVRAM.
FIG. 13 shows a configuration of a mapping table according to a second embodiment.

DESCRIPTION OF EMBODIMENTS

Figure 1:
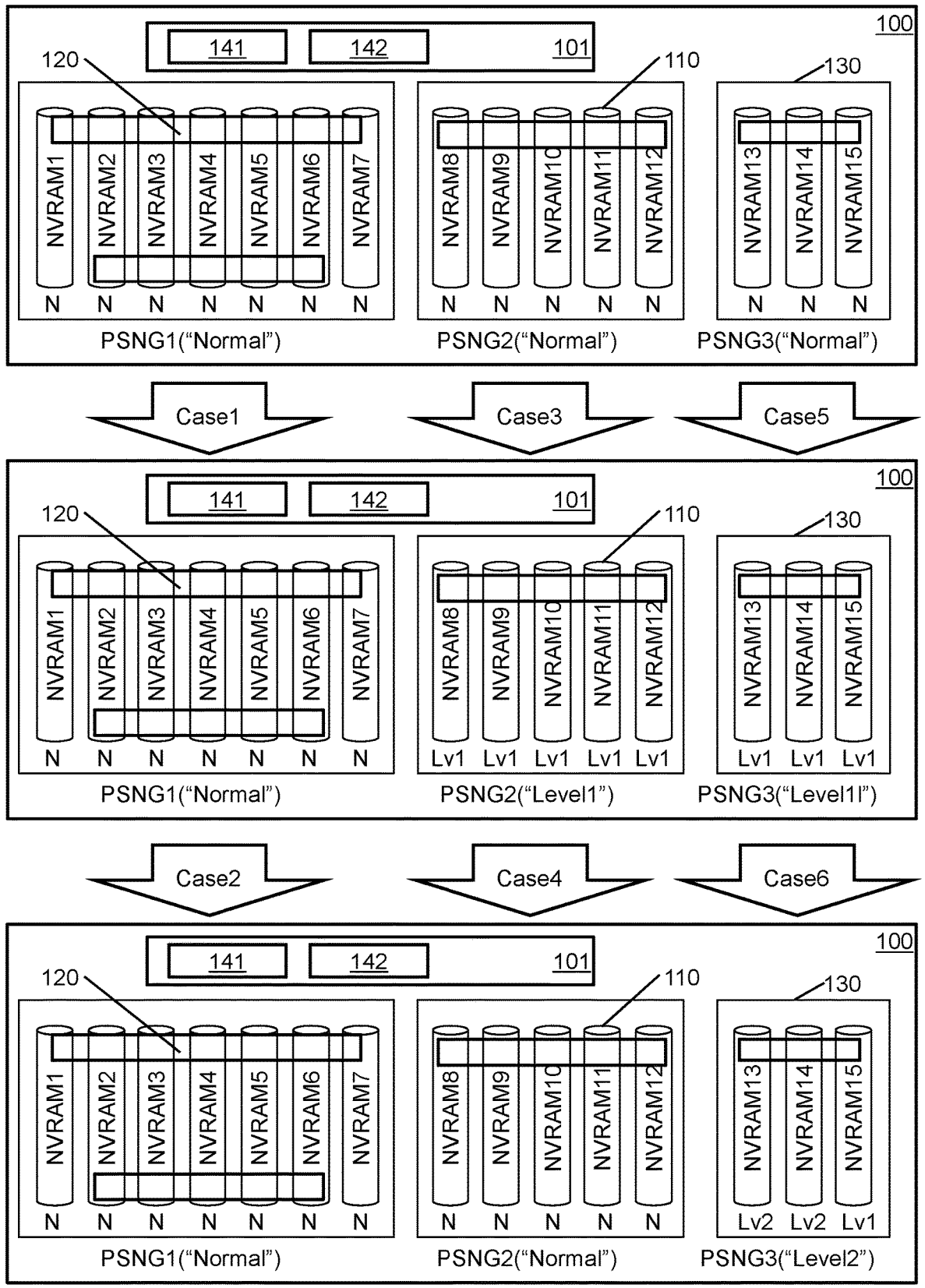
FIG. 1 shows a schematic overview of a first embodiment.

In the ensuing explanation, 'interface unit' may refer to one or more interfaces. The one or more interfaces may be one or more communication interface devices of the same type (for instance, one or more NIC (Network Interface Cards)) or may be two or more communication interface devices of different types (for instance, an NIC and an HBA (Host Bus Adapter)).

Furthermore, in the ensuing explanation, 'memory unit' may be one or more memories and may, typically, be a main storage device.

Furthermore, in the ensuing explanation, 'PDEV unit' may be one or more PDEV and may, typically, be an auxiliary storage device. 'PDEV' is an example of a storage device and in particular signifies a physical storage device (Physical storage DEVice) and is typically a nonvolatile storage device.

Furthermore, in the ensuing explanation, 'storage unit' is at least one of a memory unit and at least a portion of a PDEV unit (typically, at least a memory unit).

Furthermore, in the ensuing explanation, 'processor unit' is one or more processors. At least one processor is typically a microprocessor like a CPU (Central Processing Unit) but could also be another type of processor such as a GPU (Graphics Processing Unit). At least one processor could also be a single-core or multi-core processor. At least one processor could also be a processor in a broader sense such as a hardware circuit which performs some or all of the processing (an FPGB (Field-Programmable Gate Array) or ASIC (Application Specific Integrated Circuit), for example).

Moreover, although information for which an output is obtained in response to an input is explained in the ensuing explanation by using expressions such as 'xxx table,' information of this type could also be data of any structure or could be a learning model such as a neural network which generates an output in response to an input. Therefore, 'xxx table' can be referred to as 'xxx information.' Moreover, in the ensuring explanation, the configuration of each table is an example, and one table could also be divided into two or more tables, or all or a portion of two or more tables could also be one table.

Furthermore, in the ensuing explanation, although functions are sometimes explained using an expression 'kkk unit' (excluding interface units, storage units and processor units), the functions could be realized as a result of one or more computer programs being executed by a processor unit or could be realized by one or more hardware circuits (for example, an FPGA (Field-Programmable Gate Array) or an ASIC (Application Specific Integrated Circuit)). When the functions are realized as a result of programs being executed by a processor unit, determined processing is performed while suitably using a storage unit and/or an interface unit, and the like, and hence the functions may be implemented by at least a portion of a processor unit. Processing which is explained with the function serving as the subject of the sentence may be processing that is performed by a processor unit or by an apparatus which comprises a processor unit. A program could also be installed from a program source. A program source could also be a program distribution computer or a computer-readable recording medium (for example, a non-transient recording medium). The explanation of each function is an example, and a plurality of functions could also be gathered as one function or one function could also be divided into a plurality of functions.

Furthermore, in the ensuing explanation, 'redundancy configuration group' is a storage device group which is configured from two or more storage devices and which stores redundant data. Redundancy configuration examples include Erasure Coding, RAIN (Redundant Array of Independent Nodes), internode mirroring, RAID (Redundant Array of Independent (or Inexpensive) Disks) and so forth, and any redundancy configuration may be adopted. Therefore, 'storage device' may be a storage medium such as an NVRAM (Non-Volatile RAM) or may be a node which is a constituent element of a scale-out-type storage system (a general-purpose computer, for example). Furthermore, a 'storage system' may be a storage system which comprises a plurality of storage media as the plurality of storage devices or may be a storage system which comprises a plurality of nodes as the plurality of storage devices (a scatter storage system, for example). In the embodiments hereinbelow, the storage system is the former storage system, and the storage control system for the former storage system may be a controller in the storage system. For the latter storage system, the storage control system may be a processor unit which executes a predetermined program in each node. More specifically, for example, the 'storage system' may be a system which comprises one or more physical computers. A physical computer may be a general-purpose computer or a dedicated computer. In at least one physical computer, one or more virtual computers (VM (Virtual Machines), for example) may be executed. A virtual computer may be a computer which issues I/O requests or a computer which performs data I/O in response to I/O requests. As a result of a physical computer executing predetermined software, SDx (Software-Defined anything) may be constructed in the physical computer or in a system which comprises this physical computer. As SDx, SDS (Software Defined Storage) or SDDC (Software-defined Datacenter), for example, can be adopted. For example, an SDS storage system may be constructed as a result of software which comprises a storage function being executed by a physical, general-purpose computer. Furthermore, at least one physical computer (storage server, for example) may execute one or more virtual computers as a host computer and a virtual computer as a storage control system of the storage system (typically, an apparatus which inputs and outputs data to the PDEV unit in response to an I/O request). In other words, at least one physical computer may comprise both a function serving as at least a portion of the host computer and a function serving as at least a portion of the storage system.

Furthermore, in the ensuing explanation, when elements of the same type are explained without distinction, reference signs are used and when elements of the same type are explained with a distinction being made, element IDs are sometimes used. For example, when the NVRAM are explained without a particular distinction being made, same appear as 'NVRAM 110' and when the explanation makes a distinction between individual NVRAM, same sometimes appear as 'NVRAM1,' "NVRAM2,' and so forth. Note that, in the ensuing explanation, the reference signs are of 3 or more digits and the IDs are of less than 3 digits.

Several embodiments will be explained hereinbelow.

First Embodiment

FIG. 1 shows a schematic overview of a first embodiment.

A storage system 100 comprises a plurality of NVRAM 110 and a storage control system 101 which controls data I/O (Input/Output) to/from the plurality of NVRAM 110. The NVRAM 110 is a device which has a nonvolatile semiconductor memory. The storage may be flash memory, PRAM (Phase-change Random Access Memory), MRAM (Magnetoresistive Random Access Memory), ReRAM (Resistive Random Access Memory) or FeRAM (Ferroelectric Random Access Memory).

The storage control system 101 creates a high order NVRAM group 130 in a RAID group (redundancy configuration group) 120 according to an instruction from a management PC, described subsequently, or a preconfigured policy. The high order NVRAM group 130 is an example of a power control group. The high order NRAM group 130 will hereinafter be called the PSNG (Power Saving NVRAM Group) 130. The storage control system 101 performs power consumption control of the NVRAM 110 in PSNG units). Any RAID group 120 is also included in any PSNG 130. In other words, no RAID group 120 spans two or more PSNG 130. That is, all the NVRAM 110 which belong to one RAID group 120 are included in any one PSNG 130 and do not span two or more PSNG 130. More specifically, for example, as shown in the drawings, one NVRAM 110 (each of NVRAM3 to NVRAM5) can belong to a plurality of RAID groups 120 (RAID groups 1 and 2) but any given RAID group 110 does not span two or more PSNG 130.

The storage control system 101 comprises an I/O amount acquisition unit 141 and a power control unit 142.

The I/O amount acquisition unit 141 acquires the I/O amount for each of the plurality of PSNG 130. The I/O amount may be acquired at regular or irregular intervals. The I/O amounts acquired may be I/O amounts which are measured by the I/O amount acquisition unit 141 (or by a separate system from the storage control system 101). At least one of an 'I/O count' and 'I/O size' can be adopted as the 'I/O amount.' The 'I/O count' is the number of I/O commands (for example, the number of I/O commands per unit of time (that is, an I/O frequency such as IOPS)). The 'I/O size' is the size of the I/O target data (for example, the size of the data which is input/output per unit of time (an I/O throughput such as the transfer speed)). For each PSNG 130, the I/O amount of the PSNG 130 is an I/O amount according to the I/O amount of all the NVRAM 110 which belong to the PSNG 130 (the total or average, for example).

The power control unit 142 controls, for each of the plurality of PSNG 130, the power consumption of each of the NVRAM 110 belonging to the PSNG 130 in PSNG units based on the acquired I/O amount relating to this PSNG 130.

As a result, even when at least one NVRAM 110 belongs to a plurality of RAID groups 120, the balance between I/O performance and power savings can be maintained.

As levels of power savings in PSNG units, power saving levels of a plurality of stages are provided. For example, at least one of the following may differ depending on the PSNG 130 or may be common to all the PSNG 130:

the number of power saving levels (number of stages).

the value of power saving levels. For example, 'Normal,' 'Level1,' and 'Level2,' as illustrated in the drawings. In this embodiment, 'Normal' is the lowest power saving level (weak power savings, that is, high power consumption), and the higher the numerical value of a in 'Levela' is, the higher the power saving level (strong power savings, that is, low power consumption).

the I/O performance requirements for each power saving level. More specifically, for each power saving level, the I/O performance that is required in the power savings state according to the power saving level. The I/O performance requirements can also be represented as the I/O amount threshold range. In other words, like the 'I/O amount,' the 'I/O performance' is represented by at least one of the 'I/O count' and the 'I/O size.'

I/O performance requirements (upper limit and lower limit thresholds of the I/O amount) are associated with each power saving level. The I/O performance requirements are configured manually by the user, for example (the system administrator, for example) but could also be configured automatically based on a predetermined policy. The power control unit 142 performs the following (a) to (d) for each PSNG 130:

(a) The power control unit 142 determines whether or not the I/O amount acquired for the PSNG 130 satisfies the I/O performance requirements (I/O amount threshold range) which correspond to the current power saving level of the PSNG 130.

(b) When the determination result of (a) is true, the power control unit 142 maintains the power saving level of the PSNG 130 at the current power saving level (see, for example, Case1 and Case2 for PSNG1).

(c) When the determination result of (a) is false and the I/O amount of the PSNG 130 is less than the lower limit threshold which corresponds to the current power saving level of the PSNG 130, the power control unit 142 increases the current power saving level (see Case3 for PSNG2 and Cases 5 and 6 for PSNG3, for example).

(d) When the determination result of (a) is false and the I/O amount of the PSNG 130 is equal to or larger than the upper limit threshold which corresponds to the current power saving level of the PSNG 130, the power control unit 142 reduces the current power saving level, that is, weakens the power savings (see Case4 for PSNG2, for example).

As a result of the foregoing processing, the configured power saving level is maintained at the power saving level suited to the acquired I/O amount, for each of the PSNG 110. The specific details are as follows. That is, if the change in the I/O amount remains small, the power saving level is not modified (see Case1 and Case2). If the I/O amount increases after being reduced, the power saving level is reduced after being raised (see Case3 and Case4). If the I/O amount is reduced further after being reduced, the power saving level is raised further after being raised (see Case5 and Case6). Note that the configured power saving level (current power saving level) may be modified one level at a time irrespective of the relationship between the acquired I/O amount and I/O performance requirements or may be modified to the power saving level which corresponds to the I/O performance requirements which the acquired I/O amount satisfies.

The power savings function of the NVRAM 110 is used to control the power of the PSNG 130. The NVRAM 110 is an example of a storage device which is also capable of transitioning to any power savings state of a plurality of stages which are I/O-capable states (any of the power saving levels of the plurality of I/O-capable stages can be configured). More specifically, for example, the NVRAM 110 has power saving levels of a plurality of stages. To avoid confusion, the power saving levels for the PSNG 130 will be called 'PSNG power saving levels' and the power saving levels for the NVRAM 110 will be called 'NVRAM power saving levels' hereinbelow. As the NVRAM power saving levels, 'N' (Normal), 'Lv1,' and 'Lv2' are illustrated in FIG. 1. The larger the numerical value of $\beta$ in 'Lv$\beta$' is, the higher the power saving level (the stronger the power savings, that is, the smaller the power consumption). The I/O performance of the NVRAM 110 varies depending on the NVRAM power saving level. At least a portion of the plurality of NVRAM 110 comprises two or more NVRAM 110 with a different power characteristic (the relationship between I/O performance and power consumption). More specifically, for example, the power characteristic of the NVRAM 110 is different depending on the NVRAM 110 (or depending on the type such as the type name of the NVRAM 110 or the like). Therefore, in this embodiment, for each NVRAM 110, the NVRAM power saving level, among NVRAM power saving levels of a plurality of stages, which corresponds to the NVRAM 110, is associated with each PSNG power saving level. In the power consumption control in PSNG units, for each PSNG 130, the NVRAM power saving level of each NVRAM 110 which belongs to the PSNG 130 is taken as the NVRAM power saving level which is associated with the current power saving level of the PSNG 130. For this reason, within one PSNG 130, a variation in the values of the configured NVRAM power saving levels can arise (see Case6). Even when there is a mixture of NVRAM 110 with different power characteristics in one PSNG 130, an average (uniformity) in the I/O performance of all NVRAM 110 can be expected in this one PSNG 130. Note that the configuration of the NVRAM power saving levels involves configuring designated values according to the NVRAM power saving levels in a power savings configuration register, described subsequently, of the NVRAM 110. The NVRAM 110 controls the power consumption of the NVRAM 110 according to the designated values thus configured. The designated values are equivalent to the NVRAM power saving levels. Accordingly, associating the NVRAM power saving levels with the PSNG power saving levels is equivalent to associating the designated values with the PSNG power saving levels. In other words, the designated values for the NVRAM 110 are associated with the PSNG power saving levels regardless of whether or not NVRAM power saving levels exist.

The power control unit 142 adjusts the power saving levels between the PSNG 130 in order to keep the overall power consumption at or below a power capping value (an upper limit for the overall power consumption). More specifically, for example, when reducing the power saving level of a first PSNG 130, the power control unit 142 determines whether or not the estimated overall power consumption in a case where a reduction in the power saving level of this certain PSNG 130 is assumed, exceeds the power capping value. The 'overall power savings' is the power consumption for a whole entity (the storage system 100, for example)

which comprises the plurality of NVRAM 110. If the result of this determination is true, the power control unit 142 keeps the estimated overall power consumption at or below the power capping value by increasing the power saving level of a second PSNS 130. The 'second PSNG' is a PSNG of a lower QoS (Quality of Service) priority (priority example) than the first PSNG. As a result, the balance between I/O performance and power savings can be maintained while satisfying QoS priorities. Note that the power capping value may be configured (modified) by the user (administrator, for example) via processing PC which will be described subsequently.

This embodiment will be explained in detail hereinbelow.

Figure 2:
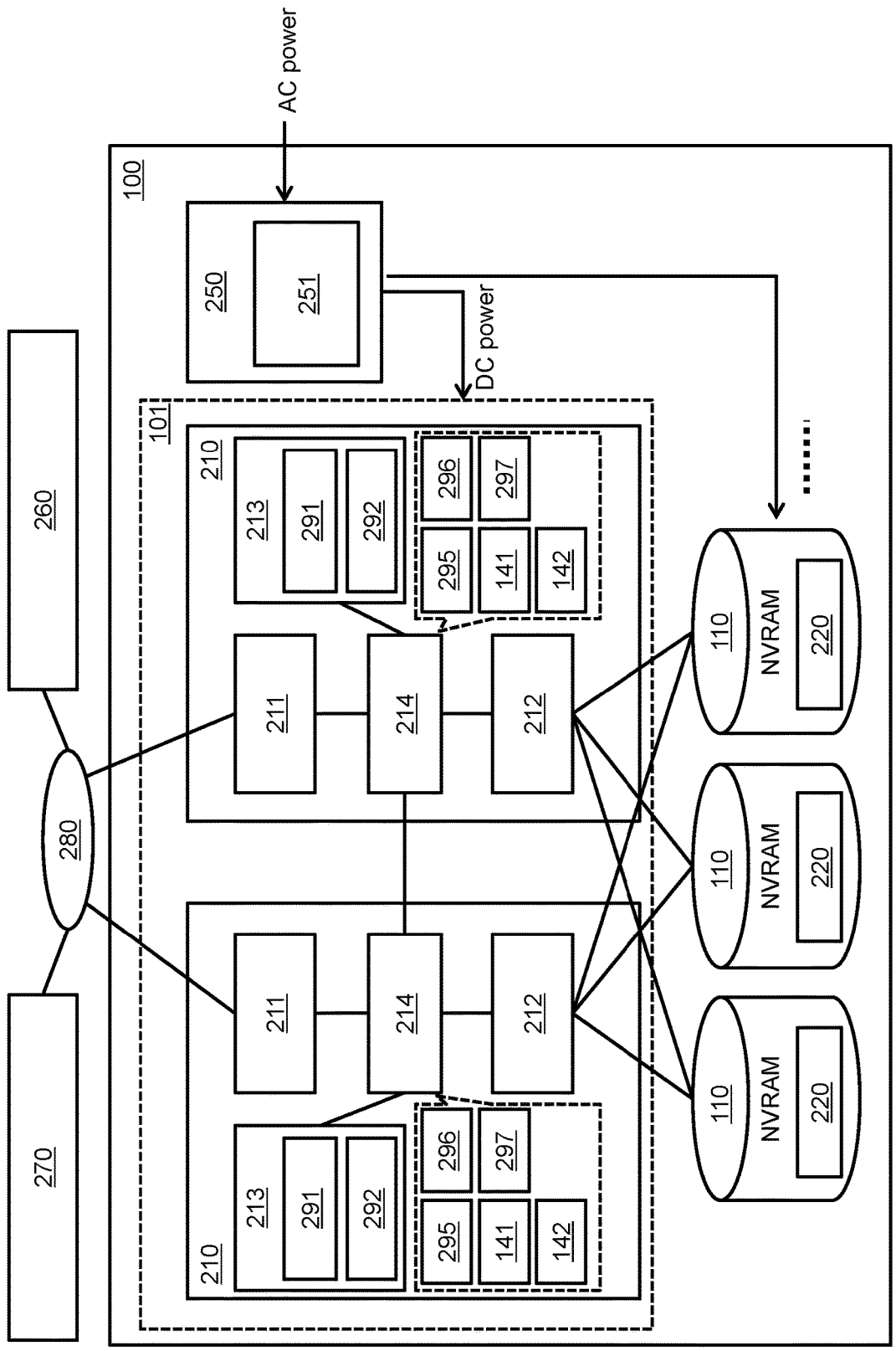
FIG. 2 shows a configuration of a whole system comprising a storage system.

FIG. 2 shows a configuration of the whole system which comprises the storage system.

The storage system 100, a host server 260 and a management PC (Personal Computer) 270 are coupled to a network 280. The host server 260 is an example of a host computer and issues an I/O request to volumes (address space) provided by the storage system 100. The management PC 270 is an example of a management computer and manages the storage system 100. The user (typically, the administrator) is able to perform configuration of the PSNG 130, configuration of the RAID groups 120, and configuration of the power capping value for the storage control system 101 via the management PC 270 (or host server 260). The network 280 may be one or more networks which are configured from a fibre channel, ethernet (registered trademark) Infiniband or LAN (Local Area Network) or the like.

The storage system 100 comprises a plurality of NVRAM 110, a storage control system 101 which controls I/O to/from the plurality of NVRAM 110, and a power supply apparatus 250 which supplies various hardware resources in the storage system 100 by changing a commercial power supply (AC power supply) to a DC power supply. The power supply apparatus 250 comprises a power supply monitor unit 251 which measures the overall power consumption.

The NVRAM 110 each comprise a power savings configuration register 220 which is a register in which designated values for power consumption control are configured. The NVRAM 110 each perform power consumption control of the NVRAM 110 according to designated values which have been configured in the power savings configuration register 220 of the NVRAM 110.

The storage control system 101 is a redundant storage controller 210, for example. The storage controller 210 comprises an FE (Front-end) interface 211, a BE (Back-end) interface 212, a memory 213, and a CPU 214 which is coupled to the FE interface 211, BE interface 212, and memory 213. The FE interface 211 and BE interface 212 are examples of interface units. The memory 213 is an example of a memory unit. The CPU 214 is an example of a processor unit.

The FE interface 211 is coupled to the network 280 and is an interface device for communicating with external apparatuses (the host server 260 and management PC 270) of the storage system 100. The BE interface 212 is an interface device for communicating with the NVRAM 110.

The memory 213 may be configured from volatile semiconductor memory such as SRAM (Static RAM (Random Access Memory)) or DRAM (Dynamic RAM) and the like. The memory 213 stores a plurality of programs including a control program 291, and a table group 292 which is one or more tables (an example of management information). The table group 292 includes a PSNG management table, an I/O performance requirement table, a mapping table, and a power management table which will be described subsequently.

The CPU 214 administers operational control of the whole storage controller 210 by executing a program in the memory 213. For example, as a result of the CPU 214 executing the control program 291, functions such as an I/O control unit 295, the I/O amount acquisition unit 141, the power control unit 142, a configuration management unit 296, and a power monitor unit 297 are realized. The I/O control unit 295 controls I/O to/from the NVRAM 110 according to I/O requests from the host server 260 (or in predetermined internal processing). The I/O amount acquisition unit 141 and power control unit 142 are as described above. The configuration management unit 296 performs configuration of the PSNG 130 and so forth. The power monitor unit 297 acquires the overall power consumption from the power supply monitor unit 251 of the power supply apparatus 250.

The PSNG management table, I/O performance requirement table, mapping table, and power management table which are contained in the table group 292 will be explained hereinbelow.

FIG. 3 shows a configuration of the PSNG management table.

A PSNG management table 300 holds information relating to the configuration of each PSNG 130. More specifically, for example, the PSNG management table 300 comprises an entry for each NVRAM 110. Each entry stores information such as a PSNG #301, PSNG power saving levels 302, a QoS 303, an NVRAM #304, an RG #305, a start address 306 and a capacity 307. The PSNG power saving levels 302 include a current level 311, a lower limit 312, and an upper limit 313. One NVRAM 110 is taken as an example hereinbelow (the 'target NVRAM 110' in the explanation of FIG. 3).

The PSNG #301 indicates the ID (identification number, for example) of the PSNG 130 which comprises the target NVRAM 110. In the explanation of FIG. 3, the PSNG 130 which comprises the target NVRAM 110 is called the 'target PSNG 130.' The current level 311 indicates the current PSNG power saving level which has been configured for the target PSNG 130. The lower limit 312 indicates the lower limit among the PSNG power saving levels which can be configured for the target PSNG 130. The upper limit 313 indicates the upper limit among the PSNG power saving levels which can be configured for the target PSNG 130. QoS 303 indicates the QoS priority which has been configured for the target PSNG 130. The NVRAM #304 indicates the ID of the target NVRAM 110. The RG #305 indicates the ID of the RAID group 120 which comprises the target NVRAM 110. In the explanation of FIG. 3, the RAID group 120 which comprises the target NVRAM 110 is called the 'target RG 120.' The start address 306 indicates the initial address of the logical address space which is provided by the target NVRAM 110 among the logical address spaces provided by the target RG 120. The capacity 307 indicates the storage capacity of the target NVRAM 110.

In this embodiment, the smaller the value of QoS 303 is, the higher the QoS priority (that is, '1st' is the highest QoS priority).

FIG. 4 shows a configuration of an I/O performance requirement table.

An I/O performance requirement table 400 holds information relating to I/O performance requirements. More specifically, for example, the I/O performance requirement table 400 comprises an entry for every PSNG power saving level of each PSNG 130. Each entry holds information such as a PSNG #401, power saving level 402, and I/O performance requirements 403. The I/O performance requirements 403 include an upper limit 411 and a lower limit 412. One power saving level of one PSNG 130 will be taken as an example hereinbelow (called the 'target PSNG 130' and 'target PSNG power saving level' in the explanation of FIG. 4).

The PSNG #401 is the ID of the target PSNG 130. The power saving level 402 indicates the power saving level of the target PSNG. The upper limit 411 indicates the upper limit among the I/O performance requirements (in the I/O amount threshold range) which corresponds to the power saving level of the target PSNG. The lower limit 412 indicates the lower limit among the I/O performance requirements which corresponds to the power saving level of the target PSNG.

The I/O amount threshold is both the I/O count and the I/O size per unit of time (one minute, for example). When the I/O amount acquired for the target PSNG 130 is equal to or larger than the upper limit 411 or less than the lower limit 412, both (or one of) the I/O count and the I/O size per unit of time which are the I/O amounts acquired for the target PSNG 130 are (is) equal to or larger than the upper limit 411 or less than the lower limit 412.

Note that the PSNG power saving levels of a plurality of stages could also be common to all the PSNG 130.

FIG. 5 shows a configuration of a mapping table.

A mapping table 500 holds information indicating the mapping relationships between the PSNG power saving levels of the PSNG 130 and the NVRAM power saving levels of each NVRAM 110 which belongs to the PSNG 130. If the number of stages of the PSNG power saving levels and I/O performance requirements and so forth are different for every PSNG 130, the mapping table 500 may be prepared for every PSNG 130, and if the number of stages of the PSNG power saving levels and the I/O performance requirements and so forth are common to all the PSNG 130, the mapping table 500 may be common to all the PSNG 130.

One PSNG 130 is taken as an example (the 'target PSNG 130' in the explanation of FIG. 5). In the mapping table 500, specifically, for example, for each NVRAM (or NVRAM type) which belongs to the target PSNG 130, the NVRAM power saving level, among the NVRAM power saving levels of a plurality of stages, which corresponds to this NVRAM 110 is associated with each of the power saving levels of a plurality of stages of the target PSNG 130. When one PSNG power saving level and one NVRAM 110 are taken as an example, the 'the NVRAM power saving level' is the highest NVRAM power saving level (that is, with the strongest power savings) among the NVRAM power saving levels which enable the NVRAM 110 to demonstrate the I/O performance corresponding to the PSNG power saving level (for example, the I/O performance indicated by the 'performance index' illustrated in FIG. 5 for the PSNG power saving level). For this reason, when two or more NVRAM 110 of different power characteristics are mixed in the target PSNG 130, the NVRAM power saving levels which are associated with the same PSNG power saving level are different for these two or more NVRAM 110. According to the example of FIG. 5, although the NVRAM power saving level 'LV2' has been associated for NVRAM1 with the PSNG power saving level 'Level2,' for the NVRAM3, the power saving level 'LV1,' which is different from the power saving level of the NVRAM1, has been associated with the PSNG power saving level 'Level2.' Note that for each of the PSNG power saving levels, the 'performance index' shown in FIG. 5 could also be an I/O performance requirement which corresponds to the PSNG power saving level.

The mapping table 500 also holds information which indicates the demonstrable I/O performance (write performance and read performance) and power consumption for each of the NVRAM power saving levels of each NVRAM 110.

The mapping table 500 may be prepared as follows, for example. That is, the configuration management unit 296 scans the power characteristic (relationship between the I/O performance and power consumption) from the NVRAM 110, for each NVRAM 110, and may create the mapping table 500 based on the information scanned from each NVRAM 110. Alternatively, the power characteristic is embedded in code as a dictionary for various type names of the NVRAM 110 when coding the control program 291, and the configuration management unit 296 may create the mapping table 500 by scanning type names when identifying the NVRAM 110 and extracting the type names using the dictionary as a key.

FIG. 6 shows a configuration of a power management table.

A power management table 600 holds a current value which is a value indicating the current overall power consumption and a power capping value. The current value is acquired from the power supply apparatus 250 by the power monitor unit 297 at regular or irregular intervals and registered in the power management table 600. The power capping value is input by the user via the management PC 270 (or host server 260) and registered in the power management table 600 by the configuration management unit 296.

FIG. 7 shows the power characteristic of a certain NVRAM 110.

As shown in FIG. 7, the power consumption and I/O performance vary for each of the NVRAM power saving levels of a plurality of stages. Moreover, there are designated values which are configured in the power savings configuration register 220 for each of the NVRAM power saving levels of a plurality of stages. Note that, for the same NVRAM 110, two or more NVRAM power saving levels are each power saving levels which are I/O capable even in a power savings state. The relationships between the power characteristics and the NVRAM power saving levels and designated values which are illustrated in FIG. 7 are configured for the NVRAM 110 but could also be stored as a table in the memory 213 of the storage controller 210.

An example of the processing performed in this embodiment will be explained hereinbelow.

Figure 8:
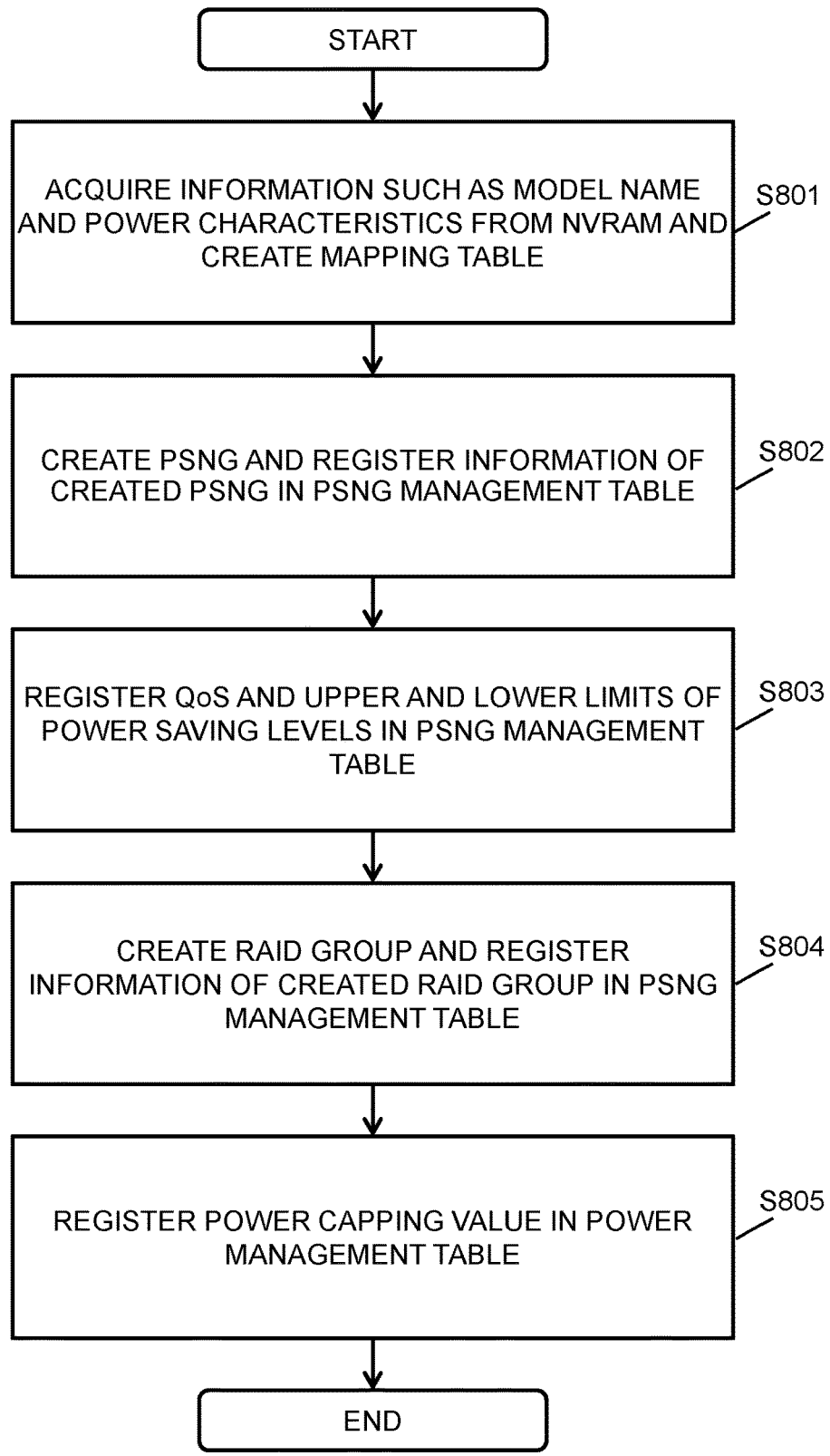
FIG. 8 shows the flow of PSNG construction processing.

FIG. 8 shows the flow of PSNG construction processing.

The configuration management unit 296 acquires (scans) the information indicating the type name and power characteristic from each of the NVRAM 110 and creates the mapping table 500 based on this information (S801).

The configuration management unit 296 creates the PSNG 130 and registers information relating to the created PSNG 130 in the PSNG management table 300 (S802). The PSNG 130 may be created automatically based on a predetermined policy or may be created according to an instruction from the user.

The configuration management unit 296 registers the QoS priority and lower and upper limits for the PSNG power saving levels of each created PSNG 130 in the PSNG management table 300 (S803). The QoS priority and lower and upper limits for the PSNG power saving levels may be determined automatically based on a predetermined policy or according to an instruction from the user, for each PSNG 130.

The configuration management unit 296 creates the RAID groups 120 and registers information relating to the created RAID groups 120 in the PSNG management table 300 (S804). Thereupon, the configuration management unit 296 authorizes (executes) the creation of one or more RAID groups 120 in the PSNG 130 but prohibits (does not execute) a RAID group 120 which spans two or more PSNG 130. The RAID groups 120 may be created automatically based on a predetermined policy or may be created according to an instruction from the user.

The configuration management unit 296 registers the power capping value in the power management table 600 (S805). The power capping value may be determined automatically based on a predetermined policy or may conform to an instruction from the user.

Figure 9:
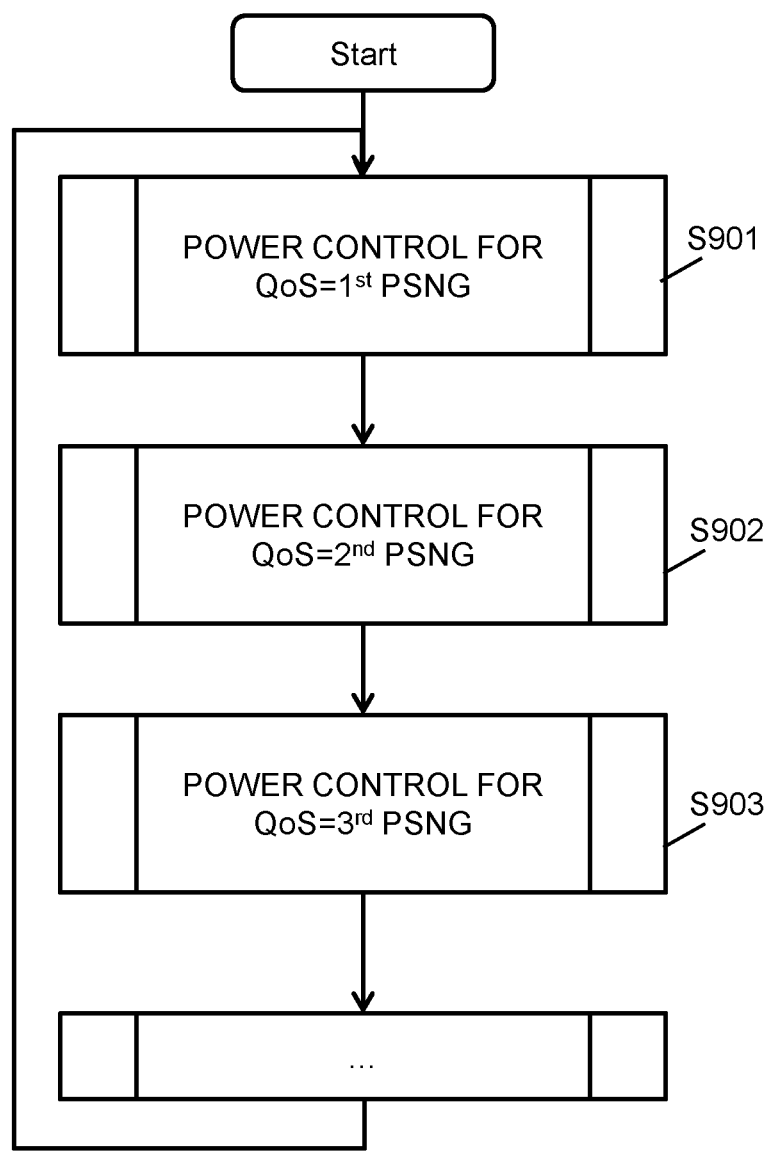
FIG. 9 shows the flow of overall power consumption control.

FIG. 9 shows the flow of overall power consumption control.

The I/O amount acquisition unit 141 refers to the PSNG management table 300 and activates power consumption control in ascending order of the value of QoS 303 (in order of rising QoS priority) (S901, S902, S903, . . . ).

One PSNG 130 is taken as an example and power consumption control is explained with reference to FIGS. 10 to 12 hereinbelow ('target PSNG 130' in the explanation of FIGS. 10 to 12).

Figure 10:
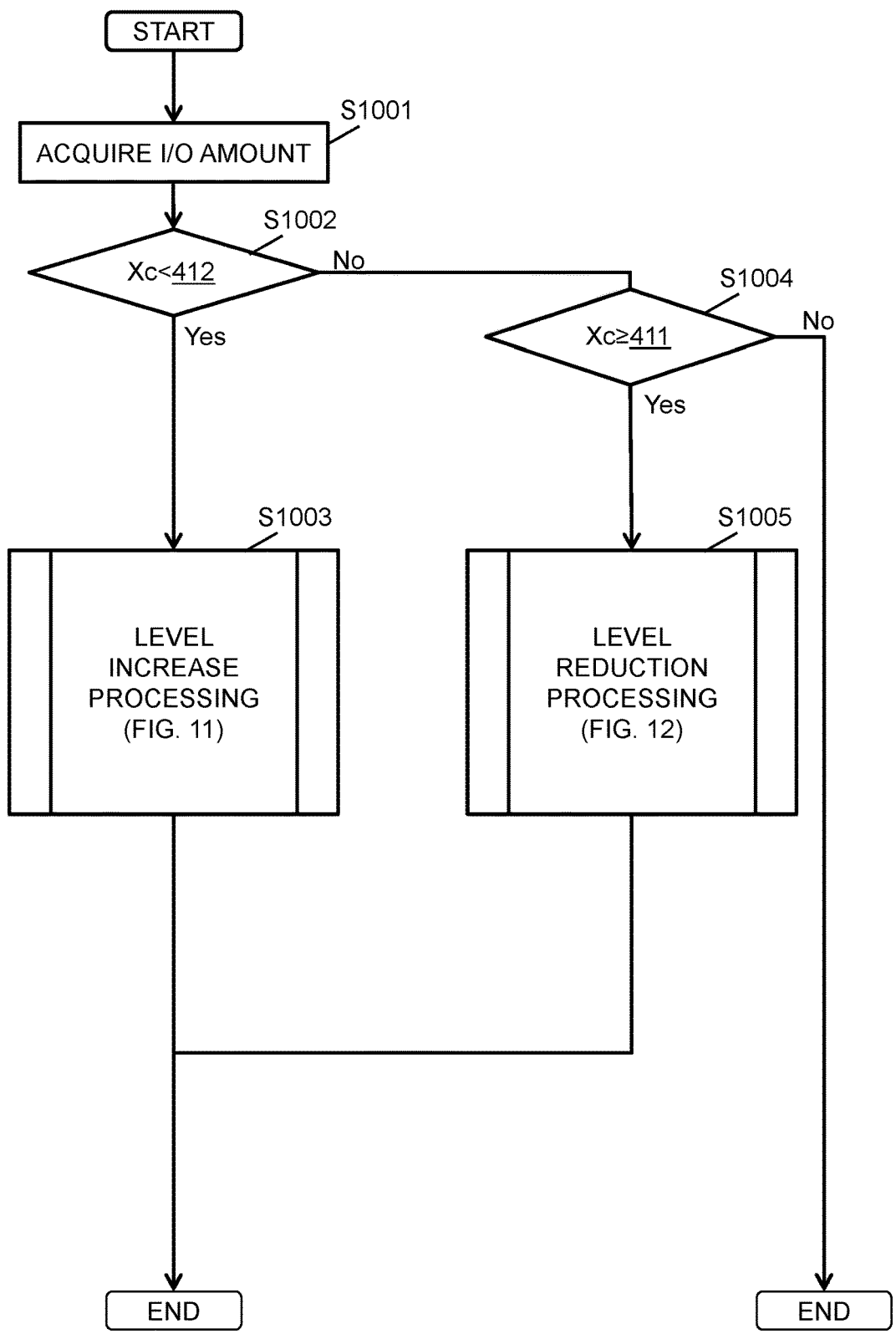
FIG. 10 shows the flow of power consumption control for a target PSNG.

FIG. 10 shows the flow of power consumption control for the target PSNG 130.

The I/O amount acquisition unit 141 acquires the I/O amount of the target PSNG 130 (S1001). Note that, in this embodiment, for each PSNG 130, the acquired I/O amount is the total of the I/O amounts of all the NVRAM 110 which belong to the PSNG 130. More specifically, for example, the I/O amount of each NVRAM 110 is measured (monitored) by the I/O amount acquisition unit 141 and the I/O amount for each PSNG 130 can be acquired based on the result of this measurement.

The power control unit 142 refers to the I/O performance requirement table 400 and determines whether or not the acquired I/O amount (Xc) is less than the lower limit 412 corresponding to the target PSNG 130 (S1002).

When the determination result of S1002 is true (S1002: Yes), processing (FIG. 11) to increase the level of the target PSNG 130 is performed (S1003). This is because, at the current power saving level of the target PSNG 130, the acquired I/O amount is relatively small and therefore stronger power savings are preferable.

When the determination result of S1002 is false (S1002: No), the power control unit 142 refers to the I/O performance requirement table 400 and determines whether or not the acquired I/O amount is equal to or larger than the upper limit 411 corresponding to the target PSNG 130 (S1004).

When the determination result of S1004 is false (S1004: No), the processing ends. In other words, the power control unit 142 maintains the current power saving level of the target PSNG 130. This is because the acquired I/O amount satisfies the I/O performance requirement which corresponds to the current power saving level for the PSNG 130.

When the determination result of S1004 is true (S1002: Yes), processing (FIG. 12) to reduce the level of the target PSNG 130 is performed (S1005). This is because, at the current power saving level of the target PSNG 130, the acquired I/O amount is relatively large and therefore weaker power savings to better enable I/O performance are preferable.

Figure 11:
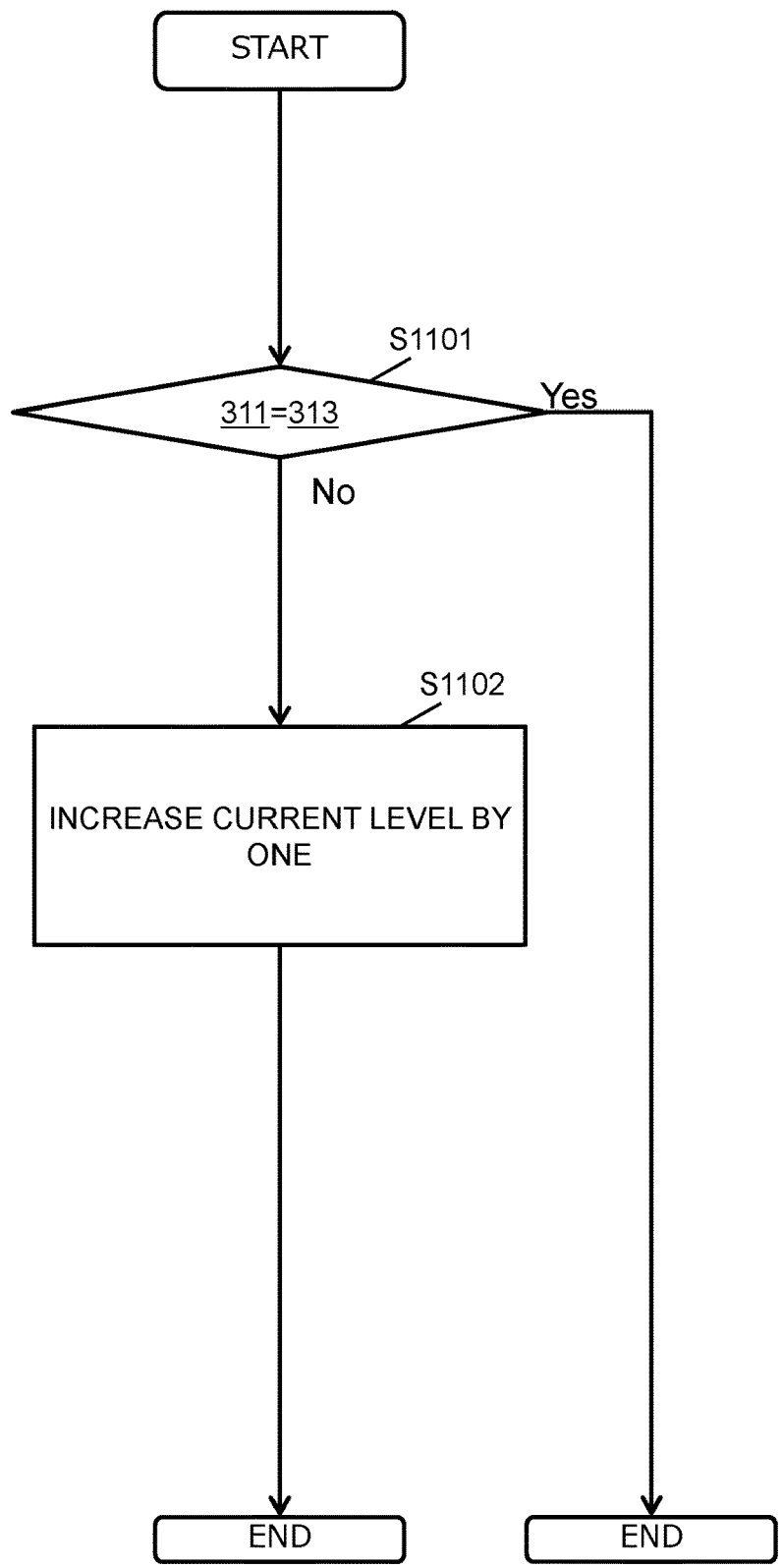
FIG. 11 shows the flow of processing to increase the level of the target PSNG.

FIG. 11 shows the flow of processing to increase the level of the target PSNG 130.

The power control unit 142 refers to the PSNG management table 300 and determines whether or not the current level 311 of the target PSNG 130 has reached the upper limit 313 (S1101).

When the determination result of S1101 is true (S1101: Yes), the processing ends. In other words, the power control unit 142 maintains the current power saving level of the target PSNG 130. This is because the current power saving level of the target PSNG 130 cannot be increased further.

When the determination result of S1101 is false (S1101: No), the power control unit 142 increases the current power saving level of the target PSNG 130 by one stage (S1102). More specifically, the power control unit 142 increases the current level 311 of the target PSNG 130 by one stage and refers to the mapping table 500, and if necessary, configures the designated value which corresponds to the NVRAM power saving level corresponding to the modified current level 311 in the register 220 of each NVRAM 110 belonging to the target PSNG 130.

Figure 12:
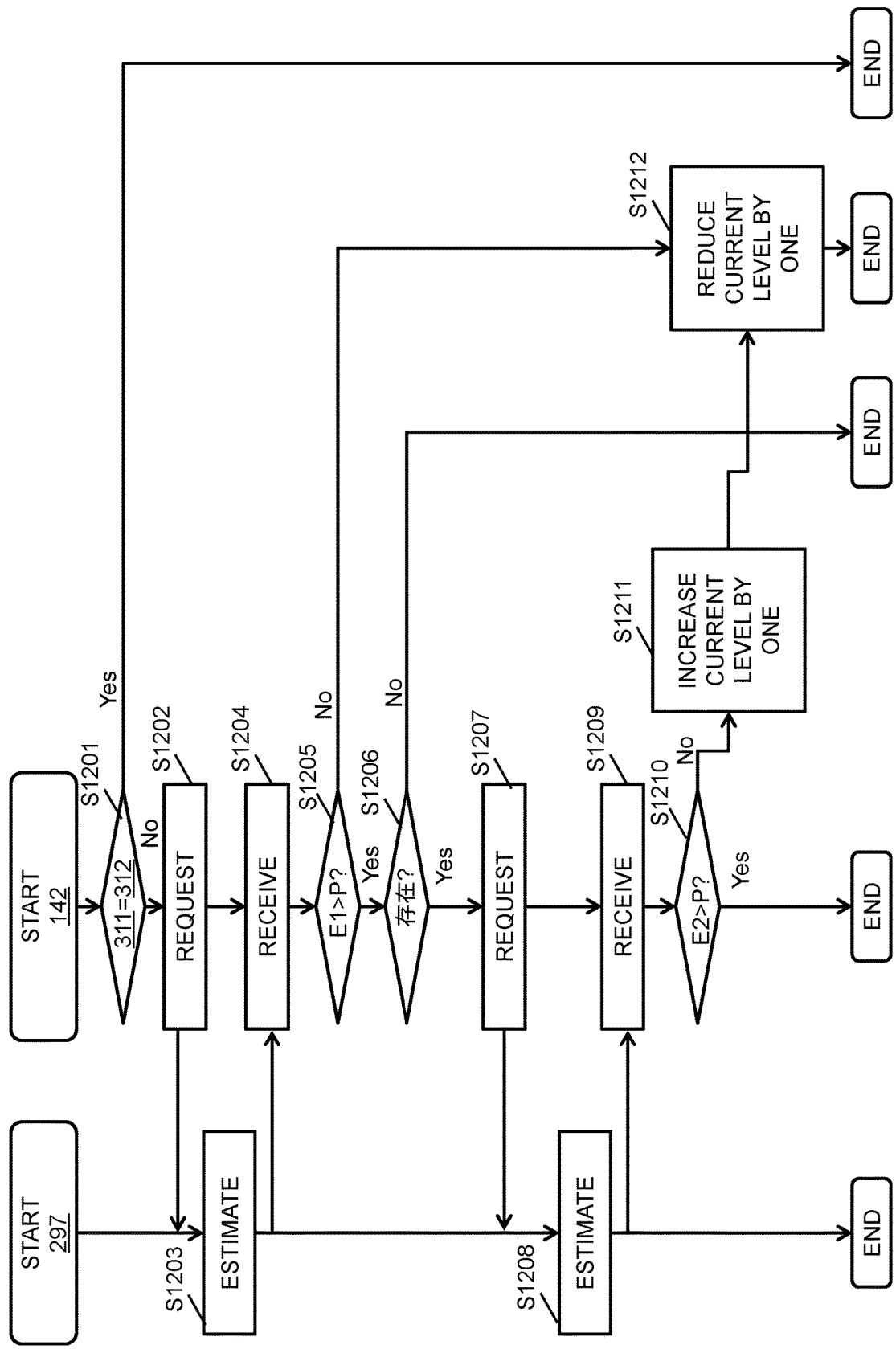
FIG. 12 shows the flow of processing to reduce the level of the target PSNG.

FIG. 12 shows the flow of processing to reduce the level of the target PSNG 130.

The power control unit 142 refers to the PSNG management table 300 and determines whether or not the current level 311 of the target PSNG 130 has reached the lower limit 312 (S1201).

When the determination result of S1201 is true (S1201: Yes), the processing ends. In other words, the power control unit 142 maintains the current power saving level of the target PSNG 130. This is because the current power saving level of the target PSNG 130 cannot be reduced further.

When the determination result of S1201 is false (S1201: No), an estimation of the overall power consumption in a case where a reduction in the current power saving level of the target PSNG 130 is assumed is performed. More specifically, the power control unit 142 requests that the power monitor unit 297 estimate the overall power consumption in a case where a one-stage reduction in the current power saving level of the target PSNG 130 is assumed (S1202). In response to this request, the power monitor unit 297 acquires the value of the current overall power consumption (for example, acquires same from the power management table 600 or acquires the value of the overall power consumption recorded in the power supply monitor unit 251 of the power supply apparatus 250), and estimates the overall power consumption in a case where a one-stage reduction in the current power saving level of the target PSNG 130 is assumed, based on this overall power consumption value and the mapping table 500 (S1203). For example, for each NVRAM 110 which belongs to the target PSNG 130, the power monitor unit 297 specifies, from the mapping table 500, the power consumption (NVRAM power consumption) which corresponds to the PSNG power saving level after the current PSNG power saving level has been reduced by one stage, estimates the overall power consumption in a case where a one-stage reduction in the current PSNG power saving level is assumed, based on the current overall power consumption value and the specified power consumption, and sends back the overall power consumption thus estimated (estimate value) to the power control unit 142. The power control unit 142 receives the estimate value from the power monitor unit 297 (S1204). Note that the estimate of the overall power consumption could also be performed by the power control unit 142 based on the value of the current overall power consumption instead of by the power monitor unit 297.

The power control unit 142 refers to the power management table 600 and determines whether or not the estimate value (E1) obtained in S1204 exceeds the power capping value (P) (S1205).

When the determination result of S1205 is false (S1205: No), the power control unit 142 reduces the current power saving level of the target PSNG 130 by one stage (S1212). More specifically, the power control unit 142 reduces the current level 311 of the target PSNG 130 by one stage and refers to the mapping table 500, and if necessary, configures the designated value which corresponds to the NVRAM power saving level corresponding to the modified current level 311 in the register 220 of each NVRAM 110 belonging to the target PSNG 130.

If the determination result of S1205 is true (S1205: Yes), an attempt is made to adjust the power saving level between the PSNG 130 to keep the overall power consumption at or below the power capping value. More specifically, the power control unit 142 refers to the PSNG management table 300 and determines whether or not a PSNG 130 with a larger QoS 303 (lower QoS priority) than the target PSNG 130 exists (S1206). When the determination result of S1206 is false (S1206: No), the processing ends. This is because power saving level adjustment between PSNG 130 where surplus power generated by increasing the power saving level of a PSNG 130 of low QoS priority is consumed by the target PSNG 130, and so forth, is not possible.

When the determination result of S1206 is true (S1206: Yes), an estimation of the overall power consumption, in a case where a one-stage increase in the current power saving level of the PSNG 130 with the largest QoS 303 (the PSNG 130 with the lowest QoS priority) among discovered PSNG 130 is assumed, is performed. More specifically, the power control unit 142 requests that the power monitor unit 297 estimate the overall power consumption in a case where a one-stage increase in the current power saving level of a PSNG 130 with a low QoS priority and a one-stage reduction in the current power saving level of the target PSNG 130 are assumed (S1207). In response to this request, using the same method as S1203, the power monitor unit 297 estimates the overall power consumption in a case where a one-stage increase in the current power saving level of a PSNG 130 with a low QoS priority and a one-stage reduction in the current power saving level of the target PSNG 130 are assumed (S1207). The power monitor unit 297 sends back an estimate value which is the estimated overall power consumption value to the power control unit 142. The power control unit 142 receives the estimate value for the overall power consumption from the power monitor unit 297 (S1208). Note that, here, the estimate of the overall power consumption could also be performed by the power control unit 142 based on the value of the current overall power consumption instead of by the power monitor unit 297.

The power control unit 142 refers to the power management table 600 and determines whether or not the estimate value obtained in S1208 exceeds the power capping value (S1209). When the determination result of S1209 is true (S1209: Yes) and there is not one PSNG 130 with a lower QoS priority than the target PSNG 130, the processing ends. In other words, S1207 to S1209 are performed preferentially starting with the lowest QoS priority as long as a PSNG 130 with a lower QoS priority than the target PSNG 130 still exists. The processing of S1207 to S1209 is repeated until there are no longer any PSNG 130 with a lower QoS priority than the target PSNG 130.

When the determination result of S1209 is false (S1209: No), the power control unit 142 increases the current power saving level (current level 311) of the PSNG 130 of a low QoS priority by one stage (S1211) and reduces the current power saving level of the target PSNG 130 by one stage (S1212). In this manner, surplus power which is generated by increasing the power saving level of a PSNG 130 of a low QoS priority can be consumed by the target PSNG 130, and a balance between I/O performance and power savings can be maintained.

Second Embodiment

A second embodiment will now be explained. In so doing, points of difference from the first embodiment will mainly be explained, while an explanation of points in common with the first embodiment will be omitted or simplified. One PSNG 130 is taken as an example hereinbelow (the 'target PSNG 130' in the explanation of the second embodiment).

FIG. 13 shows a configuration of a mapping table according to a second embodiment.

In this embodiment, for each of the PSNG power saving levels of the target PSNG 130, the NVRAM power saving level for each NVRAM 110 depends on the number of RAID groups to which the NVRAM 110 belongs. According to the example in FIG. 13, in the case of the PSNG power saving level 'Level1,' if the number of RAID groups 120 to which the NVRAM1 belongs is 1 or more but less than 3, the power saving level of the NVRAM1 is 'Lv1,' but if the number of RAID groups 120 to which the NVRAM1 belongs is 3 or more, the power saving level of the NVRAM1 is 'Normal.'

According to the embodiment, more balance between I/O performance and power savings can be expected.

Several embodiments were explained hereinabove but are merely illustrations to explain the present invention, there being no intention to limit the scope of the present invention to these embodiments alone. The present invention can also be executed in a variety of other forms.

What is claimed is:
1. A storage control system, comprising:
a memory;
an input/output device; and
a processor communicatively coupled to the memory and the input/output device, wherein the processor is configured to:
  acquire an I/O (Input/Output) amount of each of a plurality of power control groups, each of the plurality of power control groups having a plurality of storage devices forming a basis of a plurality of redundancy configuration groups; and
control power consumption of each of the plurality of storage devices in each of the plurality of power control groups based on the acquired I/O amount relating to each of the respective plurality of power control groups,
wherein the plurality of redundancy configuration groups each stores redundant data,
wherein none of the plurality of redundancy configuration groups spans two or more power control groups among the plurality of power control groups, each of the plurality of redundancy groups are contained in the plurality of power control groups and
wherein, for each of the plurality of power control groups, when the acquired I/O amount relating to a target power control group that is the power control group is greater than an I/O amount according to an I/O performance requirement which corresponds to a current power saving level that is associated with the target power control group among a plurality of power saving levels of a plurality of stages, the processor
  performs a first determination which is a determination of whether or not a total power consumption exceeds an upper limit value of the total power consumption, the total power consumption is determined by calculating the power consumption of the target power control when the target power control group is operating at an other power saving level of the plurality of power saving levels, the other power saving level being different than the current power saving level, and
  if the first determination is true, performs a modification to reduce the current power saving level and controls each of the plurality of storage device that belongs to the target power control group according to the modified power saving level, and
wherein the total power consumption is the power consumption for a whole entity which comprises the plurality of storage devices.

2. The storage control system according to claim 1,
wherein in each of the plurality of power control groups at least a portion of the plurality of storage devices is two or more storage devices for which a relationship between an I/O performance and power consumption is different,
wherein, for each of the plurality of power control groups, the processor
  selects one of the plurality of power control groups,
  selects a power saving level associated with the power control group selected from among the plurality of power saving levels, based on the acquired I/O amount relating to the power control group selected,
  for each of the plurality of storage devices contained in the power control group selected, determines from a plurality of designated values, a designated value which corresponds to the power saving level selected, each the plurality of designated values correspond to one of the plurality of storage devices based on mapping information, and designates the designated value determined for each of the plurality of storage devices, and
  repeats this for each of the plurality of power control groups,
wherein the plurality of power saving levels are each a power saving level in the plurality of power control groups,
wherein the mapping information is information in which the designated value, for each of the two or more storage devices, is associated with each of the plurality of power saving levels, and
wherein, for each of the plurality of power saving levels, the designated value for each of the two or more storage devices is a value which is designated for each of the two or more storage devices to enable each of the two or more storage devices to demonstrate I/O performance corresponding to the power saving level selected.

3. The storage control system according to claim 2,
wherein, for each of the plurality of power saving levels, the designated value for each of the two or more storage devices depends on the number of the plurality of redundancy configuration groups to which each of the two or more storage devices belongs.

4. The storage control system according to claim 1, wherein
  if the first determination is true, the processor performs a second determination which is a determination of whether or not a power control group of a lower priority than a priority of the target power control group exists, and
  if the second determination is false, the processor maintains the current power saving level.

5. The storage control system according to claim 1, wherein
  if the first determination is true, the processor performs a second determination which is a determination of whether or not at least one power control group of a lower priority than a priority of the target power control group exists,
  if the second determination is true, the processor performs a third determination which is a determination of whether or not a total power consumption, which is estimated in a case where an increase in the current power saving level of the at least one power control group and a reduction in the current power saving level of the target power control group are assumed, is equal to or smaller than the upper limit value of the total power consumption,
  if the third determination is true, the processor
    performs a modification to increase the current power saving level of the at least one power control group and controls each of the plurality of storage devices that belongs to the at least one power control group according to the modified power saving level, and
    performs a modification to reduce the current power saving level of the target power control group and controls each of the plurality of storage devices that belongs to the target power control group according to the modified power saving level.

6. The storage control system according to claim 1,
wherein each of the plurality of storage devices are capable of transitioning to any of a plurality of power savings states and each of the plurality of storage devices are I/O-capable in any of the plurality of power savings states.

7. The storage control system according to claim 6,
wherein each of the plurality of storage devices are NVRAM (Non-Volatile RAM).

8. A power consumption control method, comprising:
  acquiring, via a processor, an I/O (Input/Output) amount of each of a plurality of power control groups, each of the plurality of power control groups having a plurality of storage devices for a basis of a plurality of redundancy configuration groups,
    wherein the plurality of redundancy configuration groups each stores redundant data, and
    wherein none of the plurality of redundancy configuration groups spanning two or more power control groups among the plurality of power control groups, each of the plurality of redundancy groups are contained in the plurality of power control groups; and
  controlling, for each of the plurality of power control groups, the power consumption of each of the storage devices in each of the plurality of power control groups based on the acquired I/O amount relating to each of the respective plurality of power control group,
    wherein, for each of the plurality of power control groups, when the acquired I/O amount relating to a target power control group that is the power control group is greater than an I/O amount according to an I/O performance requirement which corresponds to a current power saving level that is associated with the target power control group among a plurality of power saving levels of a plurality of stages, the processor performs a first determination which is a determination of whether or not a total power consumption exceeds an upper limit value of the total power consumption, the total power consumption is determined by calculating the power consumption of the target power control when the target power control group is operating at an other power saving level of the plurality of power saving levels, the other power saving level being different than the current power saving level, and if the first determination is true, performs a modification to reduce the current power saving level and controls each of the plurality of storage device that belongs to the target power control group according to the modified power saving level, and wherein the total power consumption is the power consumption for a whole entity which comprises the plurality of storage devices.

9. A non-transitory computer-readable medium storing a storage control program for controlling a computer, when executed by a processor, causes the processor to:

acquire, for each of a plurality of power control groups in which each having a plurality of storage devices forming a basis of a plurality of redundancy configuration groups, an I/O (Input/Output) amount of each of the plurality of power control groups, wherein each of the plurality of redundancy configuration groups stores redundant data, and wherein none of the plurality of redundancy configuration groups spans two or more power control groups among the plurality of power control groups, each of the plurality of redundancy groups are contained in the plurality of power control groups; and control power consumption of each of the plurality of storage devices in each of the plurality of power control groups based on the acquired I/O amount relating to each of the respective plurality of power control group, wherein, for each of the plurality of power control groups, when the acquired I/O amount relating to a target power control group that is the power control group is greater than an I/O amount according to an I/O performance requirement which corresponds to a current power saving level that is associated with the target power control group among a plurality of power saving levels of a plurality of stages, the processor performs a first determination which is a determination of whether or not a total power consumption exceeds an upper limit value of the total power consumption, the total power consumption is determined by calculating the power consumption of the target power control when the target power control group is operating at an other power saving level of the plurality of power saving levels, the other power saving level being different than the current power saving level, and if the first determination is true, performs a modification to reduce the current power saving level and controls each of the plurality of storage device that belongs to the target power control group according to the modified power saving level, and wherein the total power consumption is the power consumption for a whole entity which comprises the plurality of storage devices.

10. The storage control system according to claim 1, wherein the other power saving level, is a level of power dissipation which is lower than a level of power dissipation at the current power saving level.

11. The power consumption control method according to claim 8, wherein the other power saving level, is a level of power dissipation which is lower than a level of power dissipation at the current power saving level.

12. The non-transitory computer-readable medium according to claim 9, wherein the other power saving level, is a level of power dissipation which is lower than a level of power dissipation at the current power saving level.

\* \* \* \* \*